C. L. HEISLER.
GEARING.
APPLICATION FILED APR. 9, 1920.

1,415,556.

Patented May 9, 1922.

Inventor:
Charles L. Heisler,
by Albert G. Davis
His Attorney.

UNITED STATES PATENT OFFICE.

CHARLES L. HEISLER, OF SCHENECTADY, NEW YORK, ASSIGNOR TO GENERAL ELECTRIC COMPANY, A CORPORATION OF NEW YORK.

GEARING.

1,415,556. Specification of Letters Patent. Patented May 9, 1922.

Application filed April 9, 1920. Serial No. 372,628.

*To all whom it may concern:*

Be it known that I, CHARLES L. HEISLER, a citizen of the United States, residing at Schenectady, in the county of Schenectady, State of New York, have invented certain new and useful Improvements in Gearing, of which the following is a specification.

The present invention relates to gearing and particularly to gearing for use in ship propulsion, although it will be understood that the invention is not necessarily limited thereto.

Figure 1:
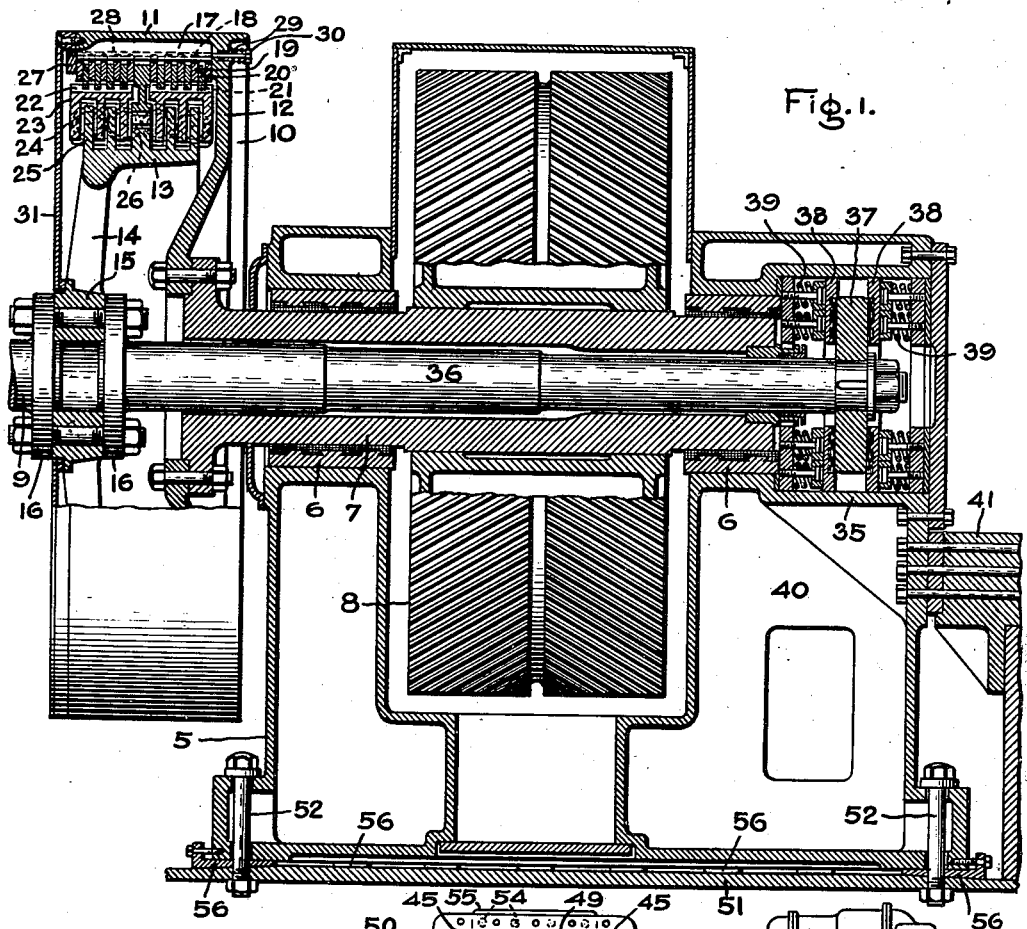
Figure 2:
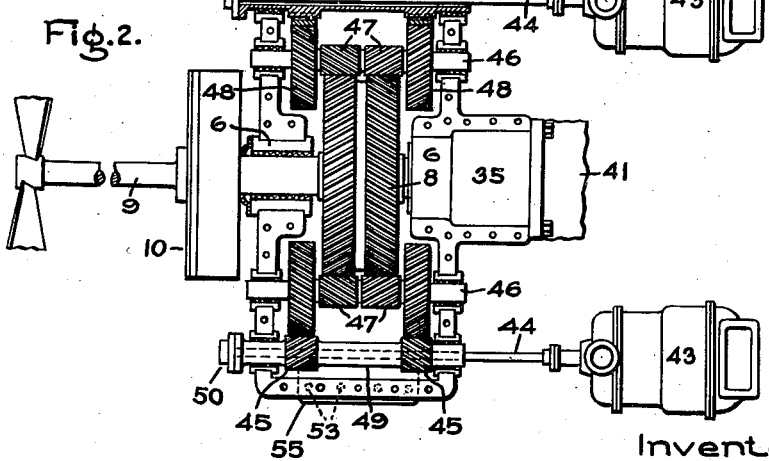

The object of my invention is to provide an improved structure and arrangement of gearing, and for a consideration of what I believe to be novel, and my invention, attention is directed to the following description and the claims appended thereto:

In the drawing, Fig. 1, is a vertical sectional view of a gearing embodying my invention, and Fig. 2 is a plan view thereof.

Referring to the drawing, 5 indicates the casing of a gearing, which casing is split on the horizontal axis of the gearing to form upper and lower halves in the usual manner. In this casing are suitable bearings 6 which support a low speed quill shaft 7 on which is mounted a low speed gear wheel 8, which, in the case of a reduction gearing, is the driven gear wheel. A driven shaft, such as a propeller shaft, is indicated at 9, and this is connected to quill shaft 7 through a suitable spring coupling 10 which is capable of circumferential yielding and also of a limited amount of axial and angular adjustment. By being circumferentially yieldable, heavy torsional blows are prevented from being transmitted from the propeller shaft to the gear teeth; by being axially adjustable, all axial thrusts will be transmitted to and borne by the thrust bearing means as pointed out more fully hereinafter, and by being angularly adjustable any misalignment of the shafts is taken care of. In the present instance spring coupling 10 is shown as comprising an outer or driving ring 11 which is connected to quill shaft 7 by an end wall 12 and an inner or driven ring 13 which is connected to shaft 9 by radially extending arms 14 which are carried by a hub 15 bolted between flanges 16 on shaft 9. On the inner surface of ring 11 are spaced axially extending teeth 17 with which engage teeth 18 on the peripheries of friction discs 19. Between friction discs 19 are friction discs 20 which have teeth 21 on their inner peripheries which engage with teeth 22 on the outer surfaces of rings 23. The inner surfaces of rings 23 and the outer surfaces of ring 13 are provided with axially extending rows of circumferentially spaced interleaving fingers 24 and 25 respectively, between which rows are arranged springs 26. Friction discs 19 and 20 are held between an end ring 27 and wall 12, and are pressed into engagement with each other by a suitable number of rods 28 which extend axially of the coupling at the periphery thereof with one end connected to ring 27 and the other end projecting beyond wall 12 and surrounded by a spring 29 located between wall 12 and a head 30 on the rod. 31 is a cover for closing the open end of the coupling. It will thus be seen that power is transmitted from quill shaft 7 through end wall 12 to ring 11 thence through teeth 17 to friction discs 19, from which power is transmitted frictionally to discs 20. From discs 20 power is transmitted through teeth 21 and 22 to rings 23 from which is transmitted by means of fingers 24, springs 26, and fingers 25 to ring 13 and thence by arms 14 to shaft 9. It will be noted that fingers 24 and 25 are spaced from each other at all points so as to permit of axial and angular adjustment.

Carried directly by, and preferably formed as an integral part of the gear casing is a thrust bearing housing 35, the same being located on the end of the gear casing remote from coupling 10. Driven shaft 9 is provided with an extension 36 which extends through quill shaft 7 to housing 35, and in such housing is a thrust bearing for shaft 36. Such thrust bearing means may be of any suitable or desired type, and in the present instance is shown as comprising a collar 37 on shaft extension 36 located between two thrust plates 38, which are held yieldingly in engagement with it by springs 39. The casing beneath bearing housing 35, and at such other points as are found desirable, is reinforced by webs as indicated at 40, so as to render the casing rigid, and the thrust bearing end of the casing is firmly placed against and fastened to a rigid abutment which in the case of a ship forms a part of the ship's structure. This may be any part of the ship's structure so long as it is rigid and will take the axial thrust of the propeller shaft without yielding, and it will be clear that by this arrangement the axial thrust of the propeller shaft will be transmitted directly to such abutment and the gearing will be entirely relieved. In the case of a ship this means that the axial thrust of the propeller shaft is taken directly by the ship's hull. In the drawing I have indicated the rigid abutment at 41.

The gear wheel 8 may be driven from a prime mover or prime movers through various combinations of gear wheels forming either single or double reduction gearing, and when more than one turbine is used they may be either independent turbines or high and low pressure turbines connected in series as regards the flow of steam. In the present instance I have shown two turbines 43, the shafts 44 of which are connected to pinions 45 located on diametrically opposite sides of gear wheel 8 and driving it through intermediate speed gearings carried by shafts 46. Each intermediate speed gearing comprises a low speed pinion 47 which meshes with gear wheel 8, and a high speed gear wheel 48 which meshes with a pinion 45 thereby forming a double reduction gearing. Each gear wheel 48 is shown as being formed in two parts placed on opposite sides of pinions 47, as this gives a symmetrical, well balanced and compact structure. Each pinion 45 is carried on a quill shaft 49 which is mounted in bearings in the gear casing, and turbine shafts 44 extend through quill shafts 49 and are coupled thereto by suitable adjustable or axial slip couplings 50, the same being so arranged as to prevent axial thrusts or any vibrations or lateral movements of shafts 44 being transmitted to the gearing or the gear casing. Also the gear casing can be adjusted independently of the driving shafts 44.

The gear casing is fastened to a base plate 51, which in the case of a ship represents the ship's bottom, in such manner that the casing as a whole may be adjusted or adjust itself to maintain correct alignment of the gear wheels. To this end the casing is fastened to base plate 51 directly under the bearings 6 for quill shaft 7 by a number of bolts 52 which pass through oversized openings in the gear casing as shown in Fig. 1. In addition to this the gear casing is fastened down on opposite sides at the middle of its length, such fastenings comprising suitable bolts as indicated at 53 and 54, which pass through flanges 55 on casing 5. This in substance leaves the four corners of the gear casing free and I can then bring the gear casing to a position to give correct shafting alignment by means of shims 56.

With the above-described arrangement, it will be seen that the gear wheels and the gear casing are entirely relieved of the end thrust on shaft 9, such end thrust being transmitted directly through the thrust bearing to the stationary abutment 41. In the case of a boat this is the ship's hull. Also the coupling 10 between shaft 9 and gear wheel 8 constitutes a universally adjustable connecting means which prevents any strains or twists being transmitted from shaft 9 to either the gear wheels or the gear casing. Likewise, in the case of the turbine or turbines, since each turbine shaft is connected to its driving pinion through a quill shaft and an axial slip coupling, axial thrusts and vibrations of the turbine shaft or shafts will not reach the gear wheels nor will the turbine shafts and couplings in any way interfere with the adjustment of the gear casing. The long turbine shaft also introduces a desired amount of torsional flexibility into the drive. By my improved arrangement, therefore, the gearing and gear casing is entirely independent of the driving shaft or shafts and the driven shaft, and the gear casing can be adjusted to bring the shafting into correct alignment, without interference from the driving and driven shafts. Furthermore, there will be no strains transmitted to the gear casing which will twist it out of true.

The specific gearing structure shown has the advantage of being symmetrical and compact, and by supporting the gear casing at four intermediate points, leaving the corners of the casing free, it is a simple and easy matter to shim it to correct position without subjecting it to internal stresses.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In combination, a gear casing, a low speed gear wheel having a quill shaft carried therein, a low speed shaft, a flexible coupling connecting it to one end of said quill shaft, an extension on said low speed shaft which extends through said quill shaft to its other end, a thrust bearing for said extension, carried by the casing, and a fixed abutment to which said thrust bearing is fastened.

2. In combination, a gear casing, a low speed gear wheel having a quill shaft carried therein, a low speed shaft which extends through said quill shaft, a thrust bearing for said low speed shaft carried by the casing, a universally adjustable coupling connecting said shafts together, and a fixed abutment to which said thrust bearing is connected and which takes the thrust of the low speed shaft.

3. In combination, a gear casing, a low speed quill shaft journaled therein, a gear wheel on said shaft, a driven shaft which extends through said quill shaft, a flexible coupling connecting said shafts together, a thrust bearing for said driven shaft, said thrust bearing being carried by the gear casing, a fixed abutment against which the casing end rests and which takes the thrust of said thrust bearing, a support for the gear casing, and fastening means intermediate the sides and ends of the casing for fastening the gear casing to said support.

4. In combination, a gear casing, a low speed gear wheel having a quill shaft carried therein, a low speed shaft, a flexible coupling connecting it to said quill shaft at one end of the casing, an extension on said low speed shaft which extends through said quill shaft, a thrust bearing for said extension, carried by the casing at its other end, a fixed abutment to which said thrust bearing is fastened, gearing means including a pinion having a quill shaft for driving said low speed gear wheel, and a driving shaft which extends through the quill pinion shaft and is connected thereto by an adjustable coupling.

5. In combination, a gear casing, a low speed gear wheel having a quill shaft carried therein, a low speed shaft which extends through said quill shaft, a thrust bearing for said low speed shaft carried by the casing at one end, a universally adjustable coupling at the other end of the casing connecting said shafts together, a fixed abutment to which said thrust bearing is connected and which takes the thrust of the low speed shaft, gearing for driving said low speed gear wheel which forms with it a double reduction gearing, said gearing comprising a pinion having a quill shaft, and a driving shaft which extends through said quill shaft and is adjustably connected therewith.

6. In combination, a gear casing, a gearing therein, a driving shaft, a driven shaft, a thrust bearing for the driven shaft carried by the casing, a fixed abutment for said thrust bearing, and adjustable means through which both said shafts are connected to said gearing whereby neither said gear casing nor said gearing will be subjected to strains from said shafts.

7. In combination, a gear casing having bearings therein, a low speed quill shaft mounted in said bearings, a gear wheel on said shaft, a driven shaft which extends through said quill shaft, a thrust bearing carried at one end of said casing for the driven shaft, an adjustable coupling at the other end of said casing which connects the driven shaft to said quill shaft, a fixed abutment against which said thrust bearing takes, a support, and fastening means which connects said casing to the support directly under said bearings and at points intermediate the sides of the casing whereby the corners of the casing are free for adjustment.

8. In combination, a gear casing having bearings therein, a low speed quill shaft mounted in said bearings, a gear wheel on said shaft, a driven shaft which extends through said quill shaft, a thrust bearing carried at one end of said casing for the driven shaft, an adjustable coupling at the other end of said casing which connects the driven shaft to said quill shaft, a fixed abutment against which said thrust bearing takes, driving gearing carried by the casing and located on opposite sides of said low speed gear wheel, and fastening means for said gear casing located under said bearings and intermediate the ends of said driving gearings.

9. In combination, a gear casing, a base plate, means fastening the casing to the base plate, a driven gear wheel, a shaft journaled in the casing and upon which the driven gear wheel is mounted, a driven shaft which is subjected to end thrust, means connecting it to the first named shaft, a thrust bearing for the driven shaft carried by one end of the casing, and a fixed abutment at the end of the casing at which the thrust bearing is located which takes the thrust of the driven shaft whereby such thrust is not taken directly by the gear casing.

In witness whereof, I have hereunto set my hand this 7th day of April, 1920.

CHARLES L. HEISLER.